Patented Dec. 31, 1946

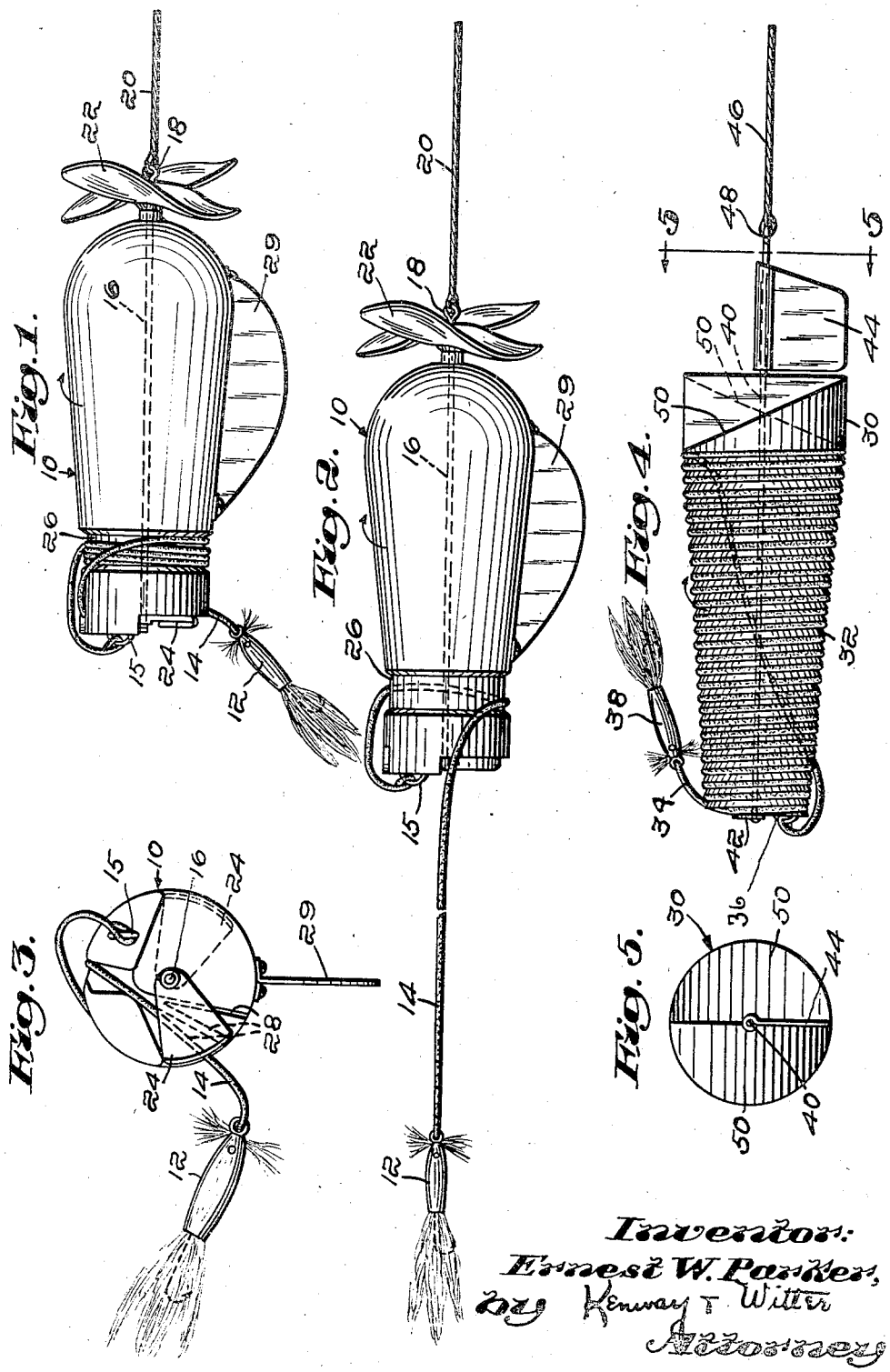

2,413,371

UNITED STATES PATENT OFFICE 2,413,371

FISH LURE CASTING PLUG

Ernest Wellesley Parker, West Roxbury, Mass.

Application May 10, 1945, Serial No. 593,066

6 Claims. (Cl. 43—51)

This invention relates to a novel casting plug adapted to serve as a vehicle for casting a fly or other relatively light fishing lure. Casting plugs and like lures are of quite substantial size and weight and are ordinarily cast at substantial distances through the use of a relatively short casting rod. It occasionally happens that a fisherman when using this type of rod desires to employ a fly or other lure of such light weight that it cannot be cast or projected any substantial distance by the short rod. The primary object of my invention resides in the production of a novel casting plug adapted to serve as a vehicle to carry such a relatively light lure, the plug embodying means operated by water resistance for automatically releasing and trailing the lure when the plug is retrieved following completion of the cast.

The casting plug of my invention is useful for casting a fly or other light lure under various otherwise difficult conditions. Large flies, such as are used for bass, present considerable air resistance surface and therefore cannot be cast long distances. When the fisherman is located in thick brush or adjacent to obstructions at the rear, it is impossible to cast a fly any substantial distance. My improved casting plug can be employed under such circumstances to cast the fly with a short casting rod even greater distances than it could otherwise be cast with a fly rod.

The novel casting plug of my invention preferably embodies an oblong body member provided with a line anchor at its forward end and adapted to have a leader wound thereonto or otherwise carried in compact relation therewith, the leader being attached to the plug at one end and having the lure attached to its other end. Means in the nature of a clip is provided on the plug for holding the leader in its compact relation and co-operating means is provided for rotating the plug and releasing the clip as the plug is retrieved after the cast has been completed. Such rotation of the plug unwinds the leader which thereupon trails the lure at a remote distance as the plug is being retrieved. The production of a novel casting plug of this nature and for the purpose described comprises a further object of the invention.

These and other features of the invention will be best understood and appreciated from the following description of preferred embodiments thereof selected for purposes of illustration and shown in the accompanying drawing in which, Fig. 1 illustrates one form of my invention in side elevation, Fig. 2 illustrates the same in operation following a cast, Fig. 3 is a rear end view, Fig. 4 is a side elevation of a modified construction, and Fig. 5 is a rear end view thereof.

Referring first to Figs. 1-3 of the drawing, 10 indicates an oblong body member constructed of suitable material such as wood or plastic, preferably hollow. The lure, as a fly 12, is attached to the free end of a leader 14 having its other end attached to an eye 15 on the rear end of the plug. A shaft 16 extends axially through the plug and has an anchoring eye 18 on its forward end for receiving the casting line 20. The shaft also has a propeller 22 fixed to its forward end. A blade 24 fixed to the rear end of the shaft is movable to and from the positions indicated in Fig. 3.

When a cast is to be made, the leader is wound onto a grooved portion 26 of the plug and the free end is placed within one of the grooves 28 at the end of the plug and held therein by the blade 24. A plurality of grooves of different depths are provided to accommodate leaders of different sizes. With the parts in the relatively compact relation illustrated in Fig. 1, the plug can be cast in the usual manner. When the cast has been made and the plug is retrieved, rotation of the propeller 22 and shaft 16 moves the blade 24 to the dotted line position shown in Fig. 3 and in which position the fly and leader are released. A fin 29 fixed to the plug prevents its free rotation and thereby assures relative rotation of the propeller and blade during the initial retrieving operation. The propeller thereafter serves to rotate the plug as the latter is retrieved and in a direction unwinding the leader, and the lure is trailed at the free end of the leader.

The invention can be constructed in various forms, as for example, that illustrated in Figs. 4 and 5. In this case the plug 30 is grooved helically at 32 to receive the leader 34 anchored to the eye 36 and carrying a fly 38. A shaft 40 extends axially through the plug and carries a blade 42 on its rear end and a flat blade 44 on its forward end. The casting line 46 is attached to an eye 48 on the forward end of the shaft. The forward end of the plug is shaped to provide propelling surfaces 50 adapted to rotate the plug when retrieved.

The leader is wound and held on the plug 30 in the manner illustrated and is cast in the same manner as above described. When the plug is retrieved the surfaces 50 rotate it in a direction to release and unwind the leader. The blade 44 acts against the water to resist rotation of the shaft with the plug, thereby causing the blade 42 to move to a position releasing the leader. Thereafter the surfaces 50 continue to rotate the plug as it is retrieved and during which the leader and lure are trailed.

Having now disclosed my invention, what I claim as new and desire to secure by Letters Patent of the United States is, 1. A lure casting plug comprising a body member adapted to carry a leader in relatively compact relation therewith, means for holding the leader in such relation, and means operated by water resistance for releasing the first named means from the leader when the member is retrieved by a line attached thereto.

2. The plug defined in claim 1 in which the last named means includes an inclined surface positioned to rotate the member when retrieved.

3. The plug defined in claim 1 in which the last named means includes an inclined surface positioned to rotate the member when retrieved, and a fin carried by the body member for resisting such rotation.

4. A lure casting plug comprising an oblong body member provided with a line anchor at its forward end, said body member being adapted to have a leader wound thereonto, a clip for engaging the leader to prevent unwinding from the member, and means operated by water resistance for releasing the clip from the leader when the member is retrieved by a line attached to the anchor.

5. A lure casting plug comprising an oblong body member provided with a line anchor at its forward end, said body member being adapted to have a leader wound thereonto, a clip at the other end of the member for engaging the leader to prevent unwinding from the member, a shaft attached to the clip and extending longitudinally through the member, and means operated by water resistance for rotating the shaft and releasing the clip from the leader when the member is retrieved by a line attached to the anchor.

6. A lure casting plug comprising an oblong body member provided with a line anchor at its forward end, said body member being adapted to carry a leader in relatively compact relation therewith, a clip for holding the leader in such relation, the body member having an inclined body rotating surface on its forward end, and water resisting means attached to the clip and adapted to release the clip from the leader when the member is retrieved by a line attached to the anchor.

ERNEST WELLESLEY PARKER.